Jan. 21, 1969      D. C. LEMKE      3,422,694

SELF-ACTUATING BRAKE

Filed Oct. 24, 1966

*INVENTOR.*
DONALD C. LEMKE
BY Benjamin W. Colman

ATTORNEY

United States Patent Office 3,422,694
Patented Jan. 21, 1969

3,422,694
SELF-ACTUATING BRAKE
Donald C. Lemke, 26071 Belledale,
Taylor, Mich. 48180
Filed Oct. 24, 1966, Ser. No. 588,862
U.S. Cl. 74—411.5            24 Claims
Int. Cl. A63h 19/00, 33/16; F16h 57/10

The present invention relates to a braking apparatus, and more particularly to a self-actuating mechanical brake for use in a miniature racing car.

Miniature racing cars, such as slot racing cars, are driven by electric motors which are energized through conductive strips on a board raceway adjacent a slot in which a car guide blade rides. The electrical energy supplied to the car motor is controlled by an operator by means of a manually adjustable potentiometer or power rheostat.

These miniature racing cars generally comprise a frame upon which are mounted a freely rotating bearing supported front axle having a pair of wheels affixed to its outer ends, a gear driven rear axle to which a pair of drive wheels are secured, an electrically operated motor drive associatedly connected to the rear axle (or alternatively to both axles in a four-wheel drive structure), an upper body structure, and electrical conductors for the current supplied to the motor drive.

To start the racing car, the power rheostat, which is direct series connected to the conductive strips, is turned on or closed and power is supplied to the car motor. When the operator wishes to stop or slow his racing car, he reduces the electrical energy supplied to the car motor. However, since the car has already attained momentum, such momentum prevents a quick or accurate stopping or slowing of the car. As a result, it is very difficult to control the speed of the racing car, especially when the car is negotiating a turn, and in such event the car usually overturns or jumps off of the track.

Various brake devices for such miniature racing cars have been adopted in the past that have been only relatively satisfactory, their principal difficulty being dependable, uniform and repetitive braking. The device of the instant invention provides for uniform and repetitive braking that is automatic and independent of extraneous conditions. Upon a decrease in motor speed, wheel braking is almost immediately effected, and upon a resumption of an axle speed greater than that of wheel speed, brakes and wheels are automatically disengaged and the vehicle is again under direct free drive.

Accordingly, it is an object of the present invention to provide a novel braking apparatus which may be used to reduce the rotational speed of a driven wheel. The wheel controlled by the invention need not be restricted to a wheel on a vehicle, but may include any rotary apparatus.

A further object is to provide an improved self-actuating mechanical brake for use in a miniature racing car.

Another object is to provide an improved braking apparatus for a vehicle which decreases the rotational speed of a driven wheel quickly, quietly, and with constant repeatability of operation.

An additional object is to provide a novel self-operating brake which permits a racing car to reduce forward speed at a far greater rate than has heretofore been possible by other known braking means.

A further object is to provide an improved mechanical braking device which rapidly decreases the momentum of a moving vehicle and which is readily adjustable and requires little or no maintenance in achieving accurate, repetitive and automatic operation.

To attain the foregoing objects, the present invention provides a braking apparatus which operates in conjunction with bearing means secured to a support member, and a motor driven axle rotatably mounted in the bearing means. Drive means are connected to the axle to rotate the axle at desired speeds. The axle is provided with at least one threaded portion, and a wheel is threadedly mounted on the threaded axle portion. A mechanism is operatively connected to the wheel and axle to permit the axle to rotate the wheel when the mechanism is in a first condition (i.e., driving condition), to permit the wheel to rotate relative to the axle when the mechanism is in a second condition (i.e., braking condition), and to stop the wheel from rotating relative to the axle when the mechanism is in a third condition (i.e., brake limit condition). At least one braking element (e.g., a resilient, friction, elastic, springy or yieldable element) is disposed between the wheel and a back-up member which is prevented from moving parallel to the axis of rotation of the axle. When the angular velocity of the wheel exceeds the angular velocity of the axle, the wheel moves axially along its associated threaded axle portion into contact with and to press the braking element against the back-up member, and thus decrease the wheel angular velocity to approach or equal the axle angular velocity.

The present invention also provides a self-actuating mechanical brake for use in a miniature racing car, including an axle supported by a car frame, and having a wheel at each end of the axle. An axle drive gear is fixedly mounted on the axle. Operator controlled drive means is connected to the axle drive gear to rotate the drive gear and axle. The axle has a right-hand threaded portion at the right end thereof upon which a wheel is threadedly mounted. The axle has a left-hand threaded portion at the left end thereof upon which a wheel is threadedly mounted. Each wheel is rotatably secured to the axle by a threaded brake adjusting nut, an actuating dog, and a dog lock nut. Each wheel has a dog stop pin rigidly secured thereto in operative relationship to the actuating dog for engagement therewith as the wheel rotates upon its associated threaded axle portion. A back-up flange member is disposed adjacent each wheel and is affixed to the car frame. A resilient brake element is disposed between each wheel and its associated back-up flange member, and is concentric with the axle. When the apparatus is in the driving condition, the drive means (e.g., electric motor with associated drive shaft, gearing, and circuitry) rotates the drive gear, the axle, and the actuating dog which engages the dog stop pin secured to the wheel to drive the wheel. When the operator reduces the energy supplied to the drive means and the rotational speed of the wheel thereupon exceeds the rotational speed of the drive gear and axle, the wheel begins to rotate relative to the axle upon its associated threaded axle portion and thereby moves (advances or threads) towards its associated brake element to squeeze the brake element against its associated back-up flange member, thus reducing the wheel rotational speed to approach or equal the axle rotational speed.

The foregoing objects and advantages, construction and operation of the present invention will become more readily apparent from the following description and accompanying drawings in which.

Figure 1:
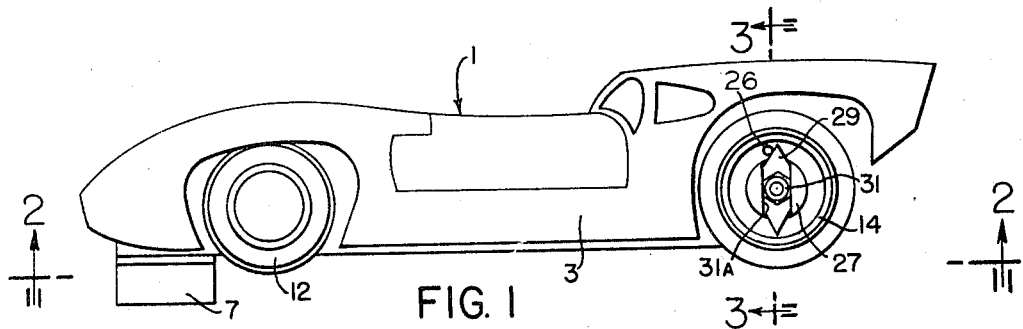
FIGURE 1 represents a side elevational view of an exemplary device or apparatus in which one form of a self-actuating braking mechanism of the present invention may be employed.
Figure 2:
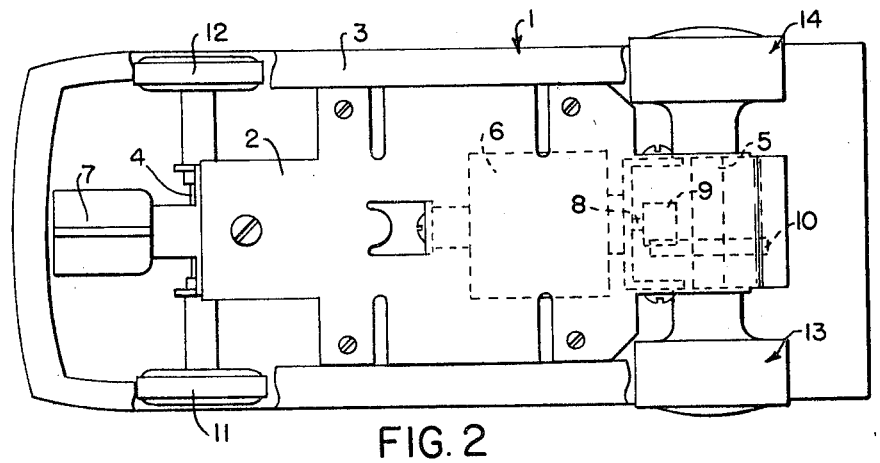
FIGURE 2 is a bottom plan view taken substantially along line 2—2 of FIGURE 1, showing some of the details of one embodiment of the present invention.

In FIGURES 1 and 2, a miniature racing "slot" car is shown designated generally by the numeral 1, and includes a frame 2, a car body 3, front and rear wheel supporting axles 4 and 5, and an electric motor 6. Pivotally secured to the bottom of the car 1 is a vertical guide blade 7 which rides in a slot of a board raceway (not shown) for guiding the path of travel of the car 1.

The electric motor 6 has a drive shaft 8 and a pinion 9 affixed to the drive shaft 8. The pinion 9 meshes with a drive gear 10 which is rigidly secured to the rear axle 5.

Front wheels 11 and 12 are mounted on the right and left ends, respectively, of the front axle 4. Rear wheels 13 and 14 are threadedly mounted on the right and left ends, respectively, of the rear axle 5.

Figure 3:
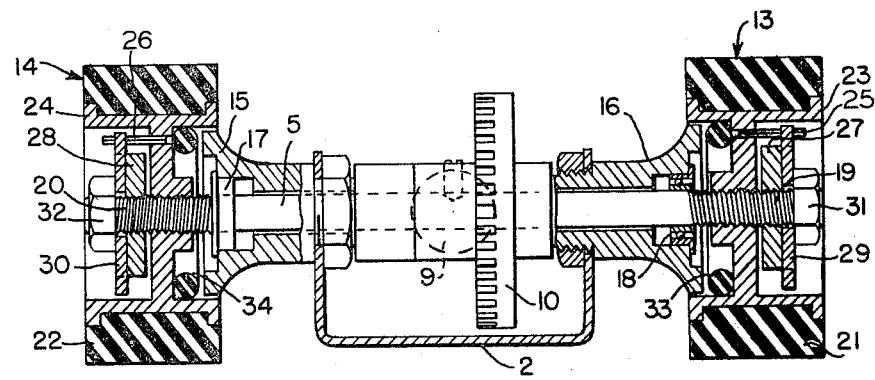
FIGURE 3 is an enlarged vertical sectional view taken substantially along the line 3—3 of FIGURE 1, showing a detailed organization of the novel braking mechanism.

As shown in FIGURE 3, stationary back-up flange members 15 and 16 are affixed to the frame 2. The back-up flange members 15 and 16 support bearings 17 and 18, respectively. The rear axle 5 is rotatably mounted within the bearings 17 and 18. The right end of rear axle 5 is provided with a right-hand thread on a portion 19 of the rear axle. The right rear wheel 13 is threadedly mounted on the threaded axle portion 19. The left end of rear axle 5 is provided with a left-hand thread on a portion 20 of the rear axle. The left rear wheel 14 is threadedly mounted on the threaded axle portion 20.

Right and left rear wheels 13 and 14 comprise tires 21 and 22, wheel rim brake drums 23 and 24, and dog stop pins 25 and 26, respectively. The tires 21 and 22 may, for example, be fabricated from a "Silastic" material. "Silastic" is a type of silicone rubber and is a trademark of Dow Corning Corporation. The wheel rim brake drums 23 and 24 are provided with threaded central apertures to mate with threaded axle portions 19 and 20, respectively. The wheel rim brake drums 23 and 24 are also provided with rigidly affixed dog stop pins 25 and 26, respectively, which protrude parallel to rear axle 5.

The rear wheels 13 and 14 are secured to and restrained from rolling off the ends of rear axle 5 by brake adjusting nuts 27 and 28, actuating dogs 29 and 30, and dog lock nuts 31 and 32, respectively. The dog lock nuts 31 and 32 are tightened firmly against actuating dogs 29 and 30, respectviely, which are seated in straight diametral channels 31a and 32a provided in the outer faces of brake adjusting nuts 27 and 28, respectively, so that brake adjusting nuts 27 and 28, actuating dogs 29 and 30, and dog lock nuts 31 and 32 rotate as a unit with rear axle 5 and drive gear 10. The brake adjusting nuts are secured on the axle portions 19 and 20 so that the wheels have some clearance to rotate before engaging the dog stop pins.

A resilient braking element 33, such as a "neoprene" ring, is centered around axle 5 and is disposed between wheel rim brake drum 23 and stationary back-up flange member 16. A similar braking element 34 is disposed between wheel rim brake drum 24 and stationary back-up flange member 15. "Neoprene" is a synthetic rubber and is a trade name for the E. I. du Pont de Nemours & Co. product.

In operation, the rear axle 5 and rear wheels 13 and 14 are motor-driven through the pinion 9 and drive gear 10 at speeds which would be the equivalent of up to 200 m.p.h. or more for a conventional size vehicle. In a first or driving condition, the actuating dogs 29 and 30 rotate with motor-driven axle 5 and engage dog stop pins 25 and 26, respectively, to rotate wheels 13 and 14.

When it is desired to stop or slow the slot car 1, the operator cuts off or reduces the electrical energy supplied to motor 6 by adjusting a manually controlled potentiometer or power rheostat. The motor speed is immediately stopped or reduced, whereupon the momentum of the car 1 becomes greater than the drive on the wheels 13 and 14. At that time the apparatus is in a second or braking condition when the wheels 13 and 14 are rotating faster than the slowed-down rear axle 5. The wheels 13 and 14 thereupon rotate relative to axle 5 and thread along threaded axle portions 19 and 20, respectively, toward the midpoint of axle 5 and thus squeeze the resilient rings 33 and 34 against the frame affixed flange members 16 and 15, respectively. This causes the wheels 13 and 14 to slow down and approach or equal the rotational speed of the axle 5. The car 1 is thereby permitted to reduce forward speed at a far greater speed than has heretofore been possible by other braking means.

During the second or braking condition described immediately above, the stop pins 25 and 26 move out of engagement with the driving end of actuating dogs 29 and 30, respectively, because the wheels 13 and 14 are at that time rotating faster than the actuating dogs 29 and 30 which rotate as a unit with axle 5. While the stop pins 25 and 26 are rotating approximately 180° relative to actuating dogs 29 and 30, respectively, ahead of the driving ends of actuating dogs 29 and 30 towards the limit ends thereof, the wheels 13 and 14 are advancing along the oppositely-threaded axle portions 19 and 20, respectively, to squeeze further the rings 33 and 34. If the wheel rotational speed is not equalized with the axle rotational speed when the stop pins 25 and 26 have rotated approximately 180° ahead of the driving end of actuating dogs 29 and 30, respectively, then a third or brake limit condition is reached. In this condition the stop pins 25 and 26 contact the limit ends of actuating dogs 29 and 30, respectively, and any relative momentum remaining in wheels 13 and 14 is dissipated as the stop pins 25 and 26 encounter the added load of axle 5, drive gear 10, pinion 9, drive shaft 8, and motor 6 through such limit ends of actuating dogs 29 and 30.

There is thus provided an adjustable, self-actuating mechanical braking apparatus which requires little or no maintenance and which repeatedly decelerates a rotating wheel with constant performance. The resilient braking elements 33 and 34 instantly revert to their unsqueezed condition and exhibit little or no wear. Moreover, the braking apparatus is automatic, quiet, and quick-acting.

Figure 4:
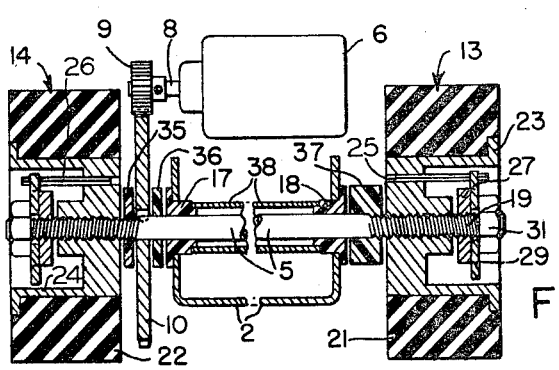
FIGURE 4 represents an enlarged vertical sectional view of another embodiment of the novel braking mechanism.

FIGURE 4 shows another embodiment of the present invention wherein elements similar in function to those shown in FIGURES 1, 2 and 3 are designated by the same reference numerals. FIGURE 4 illustrates the "sidewinder" arrangement of a slot car braking apparatus in which the motor drive shaft 8 is parallel to the rear axle 5. Braking media 35 and 36 are disposed to the left and right, respectively, of drive gear 10 which is affixed to axle 5. Similar braking media 37 is disposed between wheel rim brake drum 23 and stationary bearing 18 affixed to the frame 2.

FIGURE 4 illustrates the apparatus when the motor 6 is driving the wheels 13 and 14. In this illustrated condition there is a gap between the wheel rim brake drum 24 and braking media 35, between braking media 35 and drive gear 10, between drive gear 10 and braking media 36, between braking media 36 and stationary bearing 17, between stationary bearing 18 and braking media 37, and between braking media 37 and the wheel rim brake drum 23. When the electrical energy supplied to motor 6 is reduced or shut off, the mechanism in the wheel hubs causes the wheels 13 and 14 to advance along oppositely-threaded axle portions 19 and 20, respectively, to close the aforementioned gaps. When the gaps are thus closed, sufficient frictional forces are produced to brake or impede the wheel rotation. To support the frame member 2 against the lateral forces engendered by the braking action, a spacer tube 38 is disposed about the central portion of the axle in contact with the bearings 17 and 18.

Braking elements 33, 34, 35, 36 and 37 may be composed of resilient material, or may be composed of material which affords appropriate braking by primarily frictional forces developed by pressure applied between a back-up element and a rotating wheel, which rotates with a translational component parallel to the wheel axle.

It is to be understood that the foregoing description of the inventive braking apparatus can be applied to a vehicle device having a four-wheel drive, or a front wheel drive, as well as in the two embodiments above described and illustrated.

From the foregoing description, it will be understood that the self-actuating mechanical braking apparatus of the present invention is well adapted to provide the various objectives and advantages discussed above, that the novel braking apparatus can be adapted to a wide variety of braking operations, that various changes or modifications may be made therein, each as may be best suited to a particular application, and that the scope of the present invention as defined by the following claims is intended to include such modifications or adaptations limited only by the prior art.

I claim:
1. A braking apparatus comprising, in combination:
a support member;
bearing means secured to said support member;
an axle rotatably mounted in said bearing means;
drive means connected to said axle to rotate said axle at desired speed;
said axle having at least one threaded portion;
a wheel threadedly mounted on each threaded portion of said axle;
a mechanism opertaively connected to said wheel and axle permitting the axle to rotate the wheel when said mechanism is in a first condition, permitting the wheel to rotate relative to the axle when said mechanism is in a second condition, and limiting the wheel from rotating relative to the axle when said mechanism is in a third condition; and
at least one braking element disposed between the wheel and a back-up member which is prevented from moving parallel to the axis of rotation of said axle;
whereby when the angular velocity of the wheel exceeds the angular velocity of the axle, the wheel moves along its associated threaded axle portion to press said braking element against said back-up member, thereby decreasing the wheel angular velocity to approach or equal the axle angular velocity.

2. Apparatus according to claim 1, wherein at least one back-up member comprises a stationary flange rigidly affixed to said support member.

3. Apparatus according to claim 1, wherein at least one back-up member comprises a flange element rigidly affixed to said axle.

4. Apparatus according to claim 1, wherein at least one back-up member comprises a drive gear rigidly affixed to said axle.

5. Apparatus according to claim 1, wherein said axle has two threaded portions which are provided with oppositely-directed threads, a wheel is mounted on each of said threaded portions, and at least one braking element comprises a resilient brake ring centered around said axle.

6. Apparatus according to claim 1, wherein said mechanism includes:
a threaded brake adjusting nut, an actuating dog, and a dog lock nut securing each wheel to said axle, and a dog stop pin rigidly secured to each wheel in operative relationship to said actuating dog for engagement therewith as the wheel rotates upon its associated threaded axle portion.

7. Apparatus according to claim 1, wherein said braking element is pressed between a wheel rim brake drum provided on each wheel and a back-up flange member secured to said support member.

8. Apparatus according to claim 1, wherein said drive means includes a motor drive having a drive shaft arranged perpendicular to said axle.

9. Apparatus according to claim 1, wherein said drive means includes a motor drive having a drive shaft arranged parallel to said axle, and resilient braking media is disposed between an axle drive gear affixed to said axle and a wheel rim brake drum provided on the wheel.

10. A braking apparatus for a vehicle comprising, in combination:
a frame member rigidly secured to the vehicle;
bearing means affixed to said frame member;
an axle rotatably mounted within said bearing means;
selectively operable drive means connected to said axle to rotate said axle at various speeds;
said axle having a portion near one end thereof threaded in one direction and a portion near the other end thereof threaded in the opposite direction,
a wheel threadedly mounted on one of said axle portions and another wheel threadedly mounted on the other of said axle portions;
each wheel having a mechanism operatively connected therewith permitting the wheel to rotate with said axle when thhe mechanism is in a first condition, permitting the wheel to rotate relative to said axle when the mechanism is in a second condition, and limiting the wheel from rotating relative to said axle when the mechanism is in a third condition;
each wheel having a resilient braking element operatively associated therewith and disposed between the wheel and a back-up member which is not free to move in a direction parallel to the axis of rotation of said axle;
whereby when the rotational speed of the wheel exceeds the rotational speed applied by said drive means to said axle, the wheel rotates relative to said axle upon its associated threaded axle portion and thereby moves toward its associated resilient braking member in a direction parallel to the axis of rotation of said axle to squeeze the resilient braking element against its associated back-up member, thereby reducing the wheel rotational speed to approach or equal the axle rotational speed.

11. Apparatus according to claim 10, wherein said mechanism includes:
a threaded brake adjusting nut, an actuating dog, and a dog lock nut securing each wheel to said axle;
and a dog stop pin rigidly secured to each wheel in operative relationship to said actuating dog for engagement therewith as the wheel rotates upon its associated threaded axle portion.

12. Apparatus according to claim 10, wherein said resilient braking element is pressed between a wheel rim brake drum provided on each wheel and a back-up flange member secured to said frame member of the vehicle.

13. Apparatus according to claim 10, wherein at least one back-up member comprises a stationary flange rigidly affixed to said frame member.

14. Apparatus according to claim 10, wherein at least one back-up member comprises a flange element rigidly affixed to said axle.

15. Apparatus according to claim 10, wherein at least one back-up member comprises a drive gear rigidly affixed to said axle.

16. Apparatus according to claim 10, wherein at least one said braking element comprises a resilient brake ring centered around said axle.

17. Apparatus according to claim 10, wherein said drive means includes an electric motor having a drive shaft arranged perpendicular to said axle.

18. Apparatus according to claim 10, wherein said drive means includes an electric motor having a drive shaft arranged parallel to said axle, and resilient braking media is disposed between an axle drive gear affixed to said axle and a wheel rim brake drum provided on the wheel.

19. A self-actuating mechanical brake apparatus for use in a miniature racing car, comprising, in combination:
a car frame;
an axle supported by said frame and having a wheel at each end of said axle;
an axle drive gear fixedly mounted on said axle;
operator controlled drive means connected to said axle drive gear to rotate said drive gear and axle;
said axle having a right-hand threaded portion at the right end thereof upon which a wheel is threadedly mounted;
said axle having a left-hand threaded portion at the left end thereof upon which a wheel is threadedly mounted;
each wheel being rotatably secured to the axle by a threaded brake adjusting nut, an actuating dog, and a dog lock nut;
each wheel having a dog stop pin rigidly secured thereto in operative relationship to said actuating dog for engagement therewith as the wheel rotates upon its associated threaded axle portion;
a back-up flange member disposed adjacent each wheel and affixed to said car frame;
a resilient brake element disposed between each wheel and its associated back-up flange member and concentric with said axle;
said drive means rotating said drive gear, said axle, and said actuating dog which engages said dog stop pin secured to the wheel to drive the wheel;
whereby when the rotational speed of the wheel exceeds the rotational speed of said drive gear and axle, the wheel rotates relative to said axle upon its associated threaded axle portion and thereby moves toward its associated brake element to squeeze the brake element against its associated back-up flange member, thereby reducing the wheel rotational speed to approach or equal the axle rotational speed.

20. Apparatus according to claim 19, wherein said drive means includes an electric motor having a drive shaft arranged perpendicular to said axle.

21. Apparatus according to claim 19, wherein said drive means includes an electric motor having a drive shaft arranged parallel to said axle, and resilient braking media is disposed between said axle drive gear and a wheel rim brake drum provided on the wheel.

22. Apparatus according to claim 19, wherein at least one back-up member comprises a flange element rigidly affixed to said frame member.

23. Apparatus according to claim 19, wherein at least one back-up member comprises said drive gear rigidly affixed to said axle.

24. Apparatus according to claim 19, wherein said resilient brake element is pressed between said back-up flange member and a wheel rim brake drum provided on each wheel.

References Cited
UNITED STATES PATENTS

| | | | |
|---|---|---|---|
| 3,350,953 | 11/1967 | Stewart | 74—411.5 |
| 3,376,827 | 4/1968 | Slemmons | 104—60 |
| 3,377,742 | 4/1968 | Sheldon et al. | 104—60 X |

DONLEY J. STOCKING, *Primary Examiner.*

LEONARD H. GERIN, *Assistant Examiner.*

U.S. Cl. X.R.

46—243; 104—60; 188—134, 181